(12) United States Patent
Farrelly

(10) Patent No.: US 10,155,532 B2
(45) Date of Patent: Dec. 18, 2018

(54) ELECTRIC POWER ASSISTED STEERING SYSTEM

(71) Applicant: TRW Limited, Solihull, West Midlands (GB)

(72) Inventor: James Owen Patrick Farrelly, Kenilworth (GB)

(73) Assignee: TRW Limited, Solihull, West Midlands (GB)

(*) Notice: Subject to any disclaimer, the term of this patent is extended or adjusted under 35 U.S.C. 154(b) by 0 days.

(21) Appl. No.: 15/320,389

(22) PCT Filed: Jun. 23, 2015

(86) PCT No.: PCT/GB2015/051828
§ 371 (c)(1),
(2) Date: Dec. 20, 2016

(87) PCT Pub. No.: WO2015/198034
PCT Pub. Date: Dec. 30, 2015

(65) Prior Publication Data
US 2017/0137054 A1    May 18, 2017

(30) Foreign Application Priority Data

Jun. 25, 2014   (GB) .................................. 1411300.5

(51) Int. Cl.
*B62D 5/04* (2006.01)
*B62D 6/10* (2006.01)
(Continued)

(52) U.S. Cl.
CPC ........... *B62D 5/049* (2013.01); *B62D 5/0493* (2013.01); *B62D 6/10* (2013.01); *B62D 15/0215* (2013.01);
(Continued)

(58) Field of Classification Search
CPC ....... B62D 5/049; B62D 15/0215; G01L 5/22; G01L 25/003
(Continued)

(56) References Cited

U.S. PATENT DOCUMENTS 4,622,667 A    11/1986  Yount
8,825,336 B2 *  9/2014  Sollart .................. B60K 28/16
                                                    701/82
(Continued)

FOREIGN PATENT DOCUMENTS

DE    10047949 A1   5/2001
EP     2559985 A1   2/2013
(Continued)

OTHER PUBLICATIONS

Patents Act 1977: Search Report under Section 17(5), Application No. ADT71775P.GBA, dated Dec. 18, 2014.
(Continued)

*Primary Examiner* — Max Noori
(74) *Attorney, Agent, or Firm* — MacMillan, Sobanski & Todd, LLC

(57) ABSTRACT

A combined angular position and torque sensor assembly for use in an electric power assisted steering system having an input part for connection to an upper column shaft, an output part for connection to a lower column shaft, a torsion bar that interconnects the input shaft and the output shaft, first and second upper column angular position sensors that each produce at least one output signal that is dependent on the angular position of the upper column shaft; and a processing means unit which produces a first torque signal indicative of the torque carried by the torsion bar. The processing unit further includes a component for producing a first absolute angular position signal by processing the output signals of the first and secondary sensors in a first way and a second
(Continued)

absolute angular position signal processing the output of the same two sensors in a different way, and further includes a cross checker that performs a cross check between the two absolute position signals.

10 Claims, 8 Drawing Sheets

(51) Int. Cl.
*B62D 15/02* (2006.01)
*G01L 5/22* (2006.01)
*G01L 25/00* (2006.01)
*G01L 3/10* (2006.01)

(52) U.S. Cl.
CPC ..... *B62D 15/0235* (2013.01); *B62D 15/0245* (2013.01); *G01L 3/102* (2013.01); *G01L 5/22* (2013.01); *G01L 5/221* (2013.01); *G01L 25/003* (2013.01)

(58) Field of Classification Search
USPC .................................................. 73/862.325
See application file for complete search history.

(56) References Cited

U.S. PATENT DOCUMENTS

| | | | |
|---|---|---|---|
| 2003/0145663 | A1 | 8/2003 | Heisenberg et al. |
| 2013/0166142 | A1* | 6/2013 | Jang .................. B62D 15/0245 |
| | | | 701/34.4 |
| 2013/0261990 | A1 | 10/2013 | Ura |

FOREIGN PATENT DOCUMENTS

| | | | | |
|---|---|---|---|---|
| EP | 2559986 | A1 * | 2/2013 | ............. B62D 5/049 |
| GB | 2259892 | A | 3/1993 | |
| JP | 2003344190 | A | 12/2003 | |
| JP | 2007190985 | A | 8/2007 | |
| WO | 200142753 | A1 | 6/2001 | |

OTHER PUBLICATIONS

PCT International Search Report and Written Opinion, Application No. PCT/GB2015/051828, dated Oct. 16, 2015.
Notification of the First Chinese Office Action, Application No. CN201580043862.5, dated Jun. 5, 2018.

* cited by examiner too be faulty and an error flag can be raised. Typically when this happens the assistance torque is not applied by the motor Although dual channel torque sensors give increased safety it is not possible to continue to safely apply assistance torque if one channel is faulty even if the other is not, partly because it may not be possible to tell which channel is faulty and which is reliable, and also because there is no way to provide protection against a subsequent fault occurring in the one remaining good channel.

ELECTRIC POWER ASSISTED STEERING SYSTEM

CROSS-REFERENCE TO RELATED APPLICATIONS

This application is a national stage of International Application No. PCT/GB2015/051828 filed 23 Jun. 2015, the disclosures of which are incorporated herein by reference in entirety, and which claimed priority to Great Britain Patent Application No. 1411300.5 filed 25 Jun. 2014, the disclosures of which are incorporated herein by reference in entirety.

BACKGROUND OF THE INVENTION

This invention relates to improvements in electrical power assisted steering systems.

In a typical electric power assisted steering system, an electric motor, such as a three phase DC electric motor, is connected to a part of the steering mechanism, typically to the steering shaft that connects the steering wheel of the vehicle to the road wheels. A sensor, such as a torque sensor, produces a signal indicative of the torque applied to the steering wheel by the driver, and this signal is fed into a microprocessor. The microprocessor uses this signal to produce control signals for the motor which are indicative of the torque or current that is required from the motor. These control signals are converted into voltage waveforms for each phase of the motor within the microprocessor, and these in turn are transmitted from the microprocessor to a motor bridge driver.

The motor bridge driver converts the control signals, which are typically low level voltage waveforms, into higher level voltage drive signals that are applied to the respective phases of a motor bridge. A typical bridge comprises a set of switches that selectively apply current from a supply to the phases of the motor as a function of the high level voltage drive signals applied to the switches from the bridge driver circuit. By controlling the switches the current in the motor can be controlled relative to the motor rotor position, allowing the torque produced by the motor to be controlled. The motor in use is thereby caused to apply an assistance torque to the steering system that helps, or assists, the driver in turning of the steering wheel. Because this torque affects the output of the torque sensor, this forms a type of closed loop control allowing accurate control of the motor torque to be achieved.

The torque sensor typically comprises a torsion bar and two angular position sensors, one of which provides an output signal representing the angular position of the steering system on one side of the torsion bar and the other an output signal representing the angular position of the steering system on the other side of the torsion bar. When no torque is applied, the two output signals will be in alignment, but as a torque is applied the torsion bar twists causing the two angular position sensors to move out of alignment. This relative change in the output signals provides the measurement of torque needed.

To provide additional margin of safety in the event of a fault it is common to use a dual channel torque sensor, which produces two channels of information that each respectively provide a torque measurement. In use, the torque indicated by each channel is checked against the other and if they are in agreement it can be assumed that the torque value is reliable. If they are not in agreement, one or both channels

BRIEF SUMMARY OF THE INVENTION

A feature of the present invention is therefore to provide an electric power assisted steering apparatus that ameliorates the problems related to prior art systems when a fault is detected.

According to a first aspect the invention provides a combined angular position and torque sensor assembly for use in an electric power assisted steering system, the combined assembly comprising:

an input part for connection to an upper column shaft that in use is operatively connected to a steering wheel of the vehicle, an output part for connection to a lower column shaft that in use is operatively connected to the road wheels of the vehicle, a torsion bar that interconnects the input shaft and the output shaft, a first upper column angular position sensing means that produces at least one output signal that is dependent on the angular position of the upper column shaft;

a secondary upper column angular position sensing means that produces at least one output signal that is dependent on the angular position of the upper column shaft part; and a processing means which produces a first torque signal indicative of the torque carried by the torsion bar, characterised in that the processing means further includes means for producing a first absolute angular position signal by processing the output signals of the first and secondary sensors in a first way and a second absolute angular position signal processing the output of the same two sensors in a different way, and further comprising:

a cross checker that performs a cross check between the two absolute position signals.

A check is therefore made by the checking unit in which two absolute angular position signals are produced, the two then being compared.

In the event that the cross check reveals a difference between the two signals an error may be raised by the apparatus. The invention may therefore provide a more robust assembly that can deal with faults in the sensors or the signals output from the sensors.

The assembly may further include a third, lower column, position sensing means that produces at least one output signal that is dependent on the angular position of the lower column shaft, and the processing means may produce the first torque signal by processing the output signals from the three sensors, Each of the three angular position sensors may produce an angular position signal that repeats at least once during the permitted range of angular rotation of the input part, the range of rotation of each sensor corresponding to one full repeat being different from the other two sensors.

The processing means may generate a first of the absolute angular position signals used in the cross check by is using the output of a first one of the sensors to provide the detail and the value of the output of a second one of the sensors to indicate which repeat of the sensor is present by looking at the relative phasing between the outputs of the two sensors.

By providing the detail we mean that the signal is produced by adding the output of the signal that provides the detailed angular information to a multiple of the angular range of that sensor, i.e. the angle over which it repeats, the multiple being derived from the differential check between the output of the two sensors.

The three sensors may each produce an output signal which has a different angular range, or at least two may have a different range to one of the others.

In at least one arrangement the secondary angular position sensor may have a poor resolution (a coarse or less detailed signal) compared with the other.

The processing means may also generate a second of the absolute angular position signals used in the cross check by is using the output of the second one of the sensors to provide the resolution and the value of the output of the first one of the sensors to indicate which repeat of the sensor is present by looking at the relative phasing between the outputs of the two sensors.

If there is an error in either sensor, the two absolute position values will not agree and an error will be flagged up by the checking unit.

The apparatus may include an absolute position signal generating means that in use produces an absolute upper column position signal indicative of the angular position of the upper column shaft by combining the signals from at least one pair of the position sensors.

In this case, the checking unit may also carry out a check of the variation in the absolute angular position signal and the output signal of one or both of the sensors of the upper column shaft over a range of different angles of the upper column shaft. The applicant has appreciated that as the shaft rotates there will be some variation in the output of each sensor relative to the other due to things such as run out of the sensors These variations between the two sensors with angle will be consistent during use of the assembly, and can be monitored as the steering rotates and store in a memory. If the variation between the sensors with angular position does not vary in the expected manner, the checking unit may flag up an error. Since there are many instances during use of a steering system where the shaft is rotating it is easy to regularly perform this check within the checking unit.

If the expected variation between the signal is not present then the apparatus may be arranged to raise or lower an error flag.

The cross checker may be adapted to learn the expected variation with angular position during an initial learning phase of the apparatus by monitoring the variation in each of the signals being cross checked and storing the difference, or error, between the two signals.

The apparatus may include a memory and the learnt variation, or error, with angular position may be stored in the memory. This may be a non-volatile memory.

A set of characteristics may be stored in a look up table in the memory, each entry in the table comprising a difference value indexed against an angular position.

The behaviour may be learnt for rotation of the steering in one direction and set of characteristics stored for that direction. In addition, a different set of behaviours may be learnt for rotation of the steering in the other direction and also stored in the memory.

The table of stored data may comprise an offset value corresponding to each of a set of angular positions of the steering system, for example 100 equally spaced angular positions and 100 corresponding deviations values.

The cross checker may comprise a signal processor which may be shared with other parts of an electric power assisted steering system, such as a motor controller or a motor position sensor. The signal processor may be provided as part of an ASIC device.

The assembly may be adapted to determine the direction of rotation of the shaft and in the event that the shaft is deemed not to be rotating or rotating slowly below a predefined threshold speed the cross checker may be adapted to disregard any variation and not raise a fault.

Each of the upper angular position sensing means used in generating the torque signals may comprise two angular position sensors, each of which is adapted to generate one of the output signals, each of which is independent of the other. Each sensing means will therefore provide two signal channels 1 and 2 allowing for the independent first and second torque signals to be produced.

More specifically, each of the angular position sensors of the upper sensing means may comprise a rotary sensing element carrying a modulating track attached to the shaft and a detector or a common rotary sensing element may be used with two detectors so that the two channels are fully independent but share a physical rotor. A similar arrangement may be provided for each of the sensors of the lower sensing means.

Each of the upper and lower column sensors may have a relatively high resolution (a fine angle sensor) and may produce a signal that repeats with a period that is less than one rotation of the respective upper and lower shaft so that on its own each of the output signals does not indicate the absolute position of either of the shafts. They may repeat at 20 degrees or at 40 degrees, or one at 20 degrees and the other at 40 degrees. The upper sensor(s) may repeat at 20 degrees and the lower sensor(s) at 40 degrees. Of course, other angles of repeat could be used within the scope of the invention.

The processing means may process the upper and lower signals of each channel to produce a torque signal by using a differential process in which the relative phase of the two signals is determined and the torque is derived from the difference between the two signal values. Where each output signal of a channel varies linearly before repeating, an increase in torque will cause a drift in phase between the two output signals of the channel that represents the torque across the torsion bar.

Where each of the output signals of the upper and lower column sensors does not provide an absolute column position measurement over more than one full revolution of the shaft the apparatus may further include a secondary column sensor that produces an output signal that is dependent on the position of the input shaft, and the processing means may produce the absolute upper column angular position signal by combining the output of this sensor with the output of one of the upper and lower column sensors. This additional secondary upper column angular position sensor may be part of the upper column positions sensing means.

This secondary sensor may comprise a part of the combined torque and position sensor.

Therefore, the combined torque and angular position sensor may comprise a total of five sensors: the upper column sensing means comprising the two upper column sensors and the secondary sensor, and the lower column sensing means comprising the two lower column sensors.

The processing means may output the following signals: torque channel 1, torque channel 2, fine angle signal from the upper sensor (or an upper virtual angle from lower and upper sensors as described below) and a coarse angle signal.

The processing means may be adapted to produce the absolute angular position signal for the upper column by combining the secondary sensor output with one of the lower shaft sensor output signals and prior to combining or during the combining the processor may correct the output signal of the lower column shaft sensor to remove the effect of any twisting of the torsion bar as indicated by the torque signal that is produced by the processor.

The correction is needed to bring the frame of reference of the lower sensor into that of the upper column sensor, allowing the virtual upper signal to be combined with the coarse angle signal to generate an absolute upper column angle signal. If an output signal from the upper column sensing means in the production of the absolute position signal, with the lower column shaft sensors playing no part, the correction would not be needed.

The system may include a motor controller that receives at least one of the torque signals and causes the motor to produce an assistance torque. It may also receive the absolute position signal produced by the processor.

The skilled reader will understand that by using the term "connected" we mean that the parts in are in direct contact or are connected indirectly, for instance through intermediate parts such as a gearbox that is located between the motor and the output shaft.

The motor position sensor may comprise a physical position sensor such as a rotary encoder. Alternatively it may comprise a virtual position sensor in which the position of the rotor is determined by monitoring one or more parameters of the motor, such as the motor current in one or more of the motor phases and the motor inductance.

The third torque signal may be generated by producing a virtual torque signal and to do so the processing means may comprise Lower column absolute position determining means that determines the absolute position of the lower column from the motor position;

and

Virtual torque determining means that compares the absolute upper column position signal with the lower absolute position signals to determine the deflection of the torsion bar and therefrom the torque.

The virtual torque may be determined from the angular deflection of the torsion bar.

The first angular position signal and additional angular position signal (from the additional upper column sensor when provided) may repeat periodically as the upper column shaft rotates, the signals drifting out of phase over multiple rotations to allow an absolute position measurement over more than one rotation to be determined.

To determine the absolute angular position of the lower shaft it is required that the processing means can determine the absolute position of the motor in the same frame of reference as the column shaft.

The motor position sensor may produce a value that increases from a minimum to a maximum every 360 degrees of electrical rotation, repeating ad nauseum for each full electrical rotation thereafter.

To facilitate further processing, an unwrapped motor position signal may be formed. At key on this is initialised to the initial reading from the motor position sensor. At every subsequent software iteration the difference between the current and the previous motor position signal is added to the unwrapped motor position signal. When forming the difference between current and the previous motor position signals, any difference >180 deg or less than −180 deg indicates that the motor position signal has wrapped. 360 degrees is added or subtracted to the difference to bring it back into the range +/−180 deg. This corrected difference is used to update the unwrapped motor position signal.

To convert this repeating signal into an absolute position signal in the upper column shaft frame of reference, the processing means may additionally add to this signal a delta offset value that is indicative of the angular position of the motor within one electrical rotation at the time when the upper column is at zero degrees with no torque applied across the torsion bar.

In addition the processing means may also apply to this signal a base motor position value which is representative of how many motor electrical rotations the motor is from the straight ahead position, typically with a zero value corresponding to the upper column also being at zero degrees and with no torque carried by the torsion bar.

Both of these offsets are required if the lower column absolute position is to be determined in the frame of reference of the upper column, without which the comparison between absolute lower column position and upper column position could not be made.

The delta offset may be stored in a memory and may be retained for use during key on when the system is switched to a state in which position measurements are made.

The base motor position value cannot be stored for use at key on because it may change when the system is switched off and measurements are not being taken.

The processing means may be adapted to determine the base motor position value at key on by comparing the motor position from the position sensor with the absolute upper column position to determine a central, most likely, candidate, choosing a higher candidate that is one motor wrap above this and a lower candidate that is one motor wrap below this, and during subsequent unpowered motion of the steering system producing a torsion bar deflection value from each candidate and ruling out the candidates that give implausible torsion bar deflection values over time as the steering system moves until there remains only one plausible candidate.

At key on, any of the three candidates is plausible. However, in use all but one will produce a torsion bar deflection signal that has a value that is physically impossible due to fact that the physical torsion bar deflection is limited by dog stops.

Of course, if the torque sensor is known to be working at key on there is no need to adopt this approach. In that scenario, the torque in the torsion bar will be known reliably and can be taken into account when observing the motor position to give a simple calculation of base motor offset.

The torque sensor and the motor position sensor may each comprise discrete processing units, each having its own integrated circuit and timing. The applicant has appreciated that this can lead to small timing errors in the capture of the position signals, which can give unacceptable errors between the torque signals produced by the torque sensor and the virtual torque signal.

To compensate for this, each processing unit may apply a time stamp to the signals indicating the precise time that the signal value corresponds to. During any processing that requires signals from the two processing units to be combined a correction may be applied to compensate for any differences in the time stamps. This effectively allows the signals to be adjusted to bring them to precisely the same frame of reference (in time).

The reader will appreciate that in at least one arrangement within the scope of the present invention, there is some commonality between the parts that are used to form one of the torque channels and the parts used to produce the absolute angular position signal. This can lead to a common mode of failure whereby a fault in the torque signal can be produced, which leads to a fault in the absolute position signal. However, the cross check of the invention can help with the detection of such a common mode fault.

In a further refinement, each value of the output signals may be marked with a precise time stamp indicating the time at which the value is correct. This time stamp may be tied to a clock signal that drives each processor that generates the signal.

The apparatus may be arranged so that, when any two signals are combined, the time of the two signals is aligned based on the respective time stamps so that any difference associated with differences in time of the signals is reduced.

By correcting the signals to ensure they are aligned in time the accuracy of the processed signals, such as torque or motor position, can be improved.

Other advantages of this invention will become apparent to those skilled in the art from the following detailed description of the preferred embodiments, when read in light of the accompanying drawings.

DETAILED DESCRIPTION OF THE INVENTION

Figure 1:
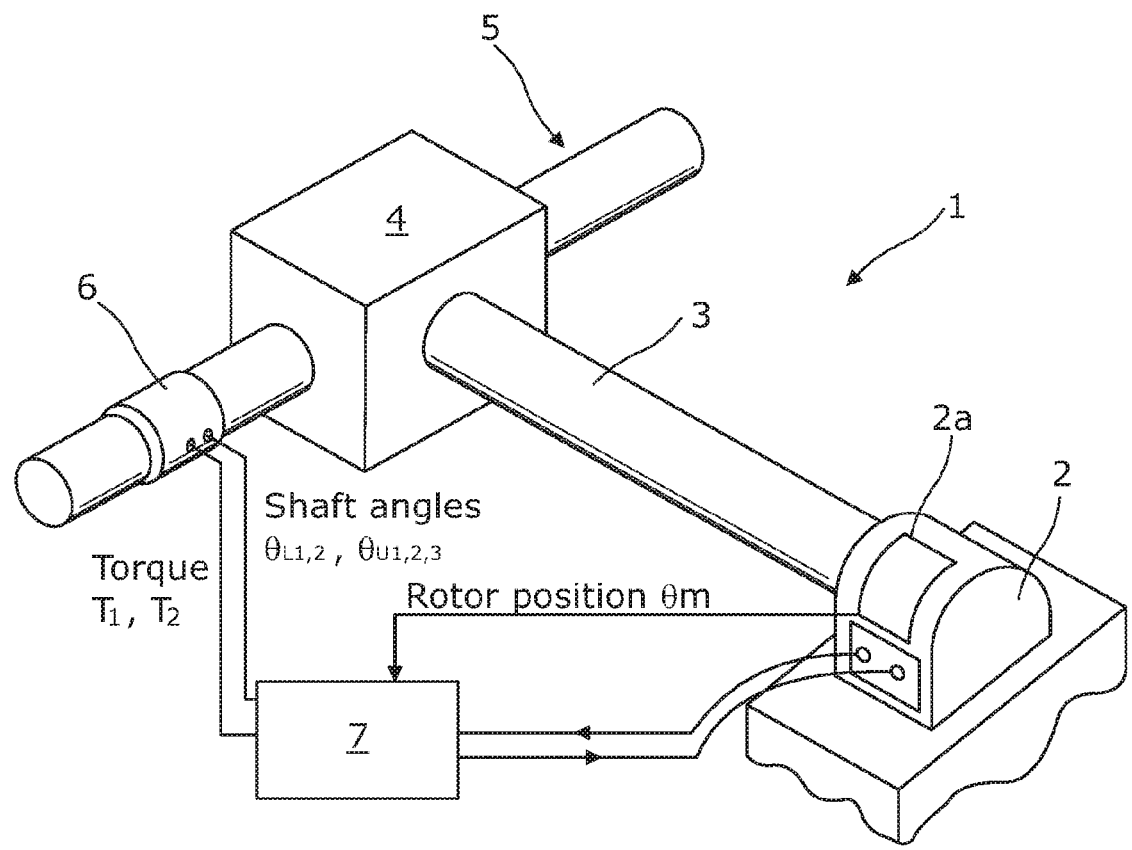
FIG. 1 is a general view of a part of an electric power assisted steering system which falls within the scope of the present invention.

As shown in FIG. 1, an electric power assisted steering system 1 is located within a steering apparatus between the steering wheel and the road wheels. The system comprises an electric motor 2 which has an output shaft 3 that is connected to a lower steering column shaft by a gearbox 4, usually comprising a worm gear that cooperates with a wheel gear. The lower shaft is connected to the road wheels of the vehicle, indirectly thought a rack and pinion or other connection. An upper column shaft supports the steering wheel, and connecting the upper shaft to the lower shaft is a torque sensor 6. The torque sensors comprises a torsion bar that connects the upper and lower shafts, designed to twist by a known amount in response to a torque applied across the torsion bar as the driver turns the steering wheel. The maximum twist is limited by providing dog stops on the upper and lower shafts to +−5 degrees.

The torque sensor detects the twist of the torsion bar and converts this into at least one torque signal, although as will be apparent in a preferred embodiment it produces two torque signal channels, and one of these torque signals is fed to a controller 7 of a motor drive circuit that is provided within a microprocessor chip. The controller produces motor phase voltages that are applied to the switches of a motor bridge associated with each phase of the motor to cause the motor to produce a torque that assists the driver. This is usually proportional to the measured torque, so that as the driver applies a higher torque the motor provides a higher amount of assistance to help turn the wheel.

Figure 2:
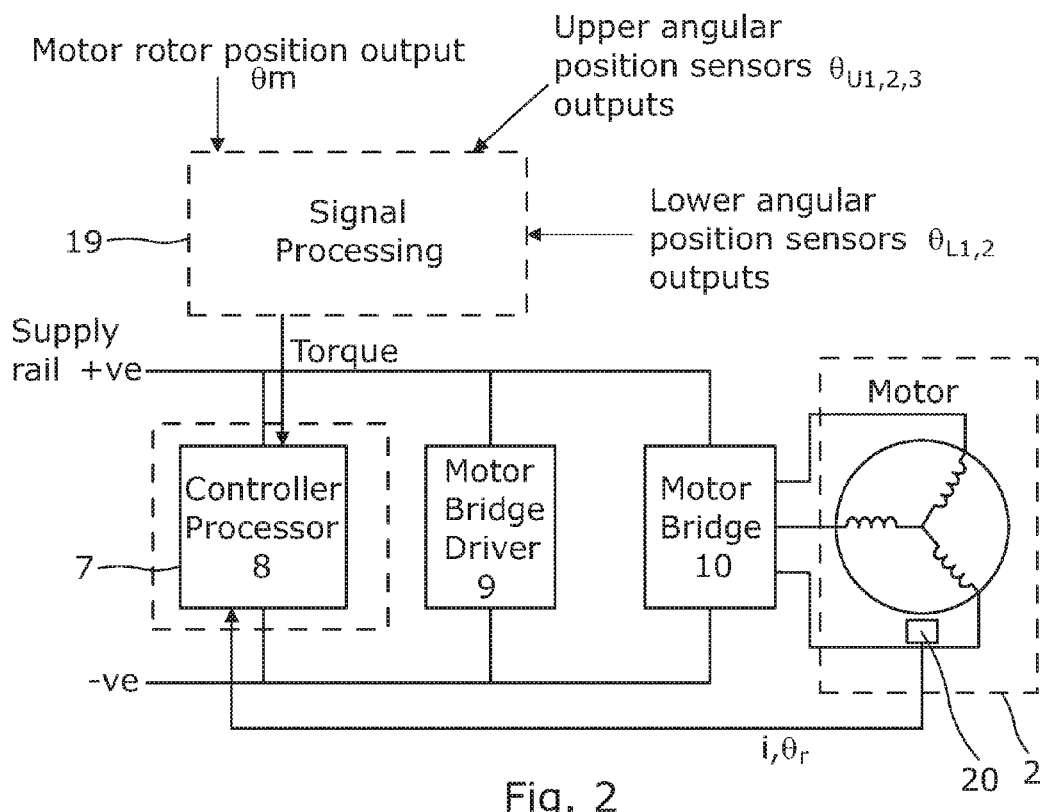
FIG. 2 is a block diagram of the key parts of an electrical circuit of the system of FIG. 1.

As shown in FIG. 2, the controller comprises a microprocessor 8 that receives the torque signal and a measure of the current i flowing in the motor (either in each phase or the overall current into or out of the motor). It also receives a measure of the motor rotor position from a motor rotor angular position sensor connected to the motor, or it calculates this internally from the current signals. The rotor position together with current allows the controller to determine the torque that is being applied. The measure of the torque from the torque sensor is used by the controller to determine what torque it is to demand from the motor. Again this is well known in the art, and many different control strategies and motor phase voltage waveforms to achieve the required torque have been proposed in the art.

The output of the microprocessor 8 will typically be a set of motor phase voltage waveforms, typically PWM waveforms that represent the phase voltages that are required by the controller to achieve the desired motor current and hence motor torque. These are low level signals, and are fed from the controller to the inputs of a motor bridge circuit 9. The function of the motor bridge circuit 9 is to turn the low level signals into the higher level drive signals for the switches of a motor bridge 10. For instance with a three phase motor each phase will be connected to the positive supply through a high switch and the ground through a low switch, only one of which will be connected at any given time according to the pattern defined by the PWM switching waveforms.

Figure 3:
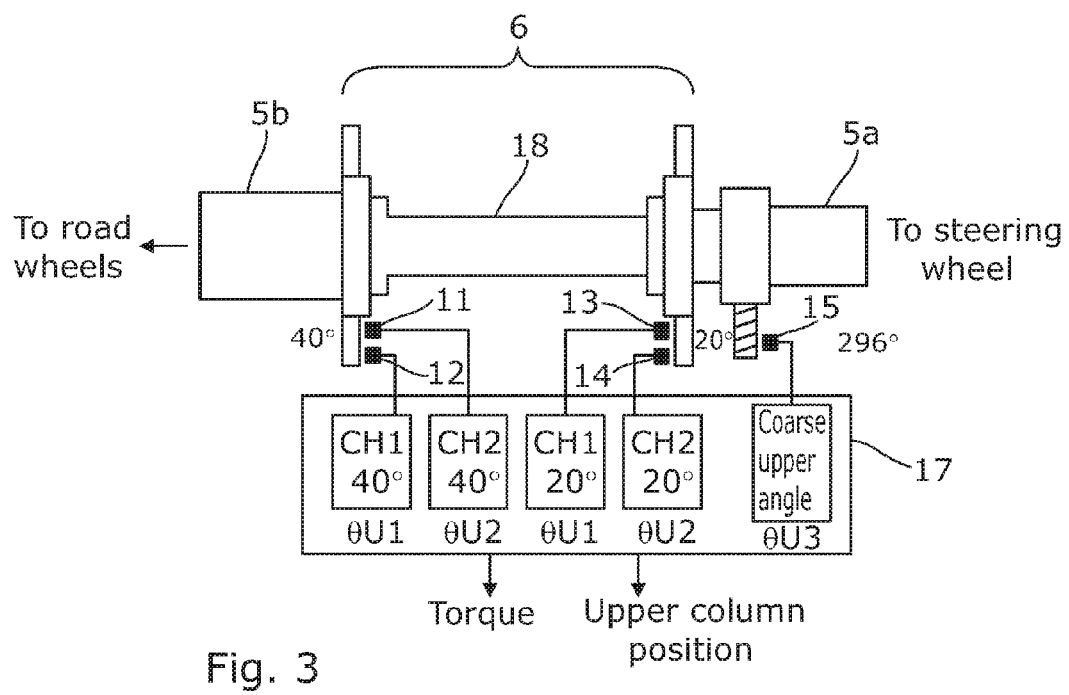
FIG. 3 is shows the key components of a combined torque and angular position sensor used within the system of FIG. 1.
Figure 4:
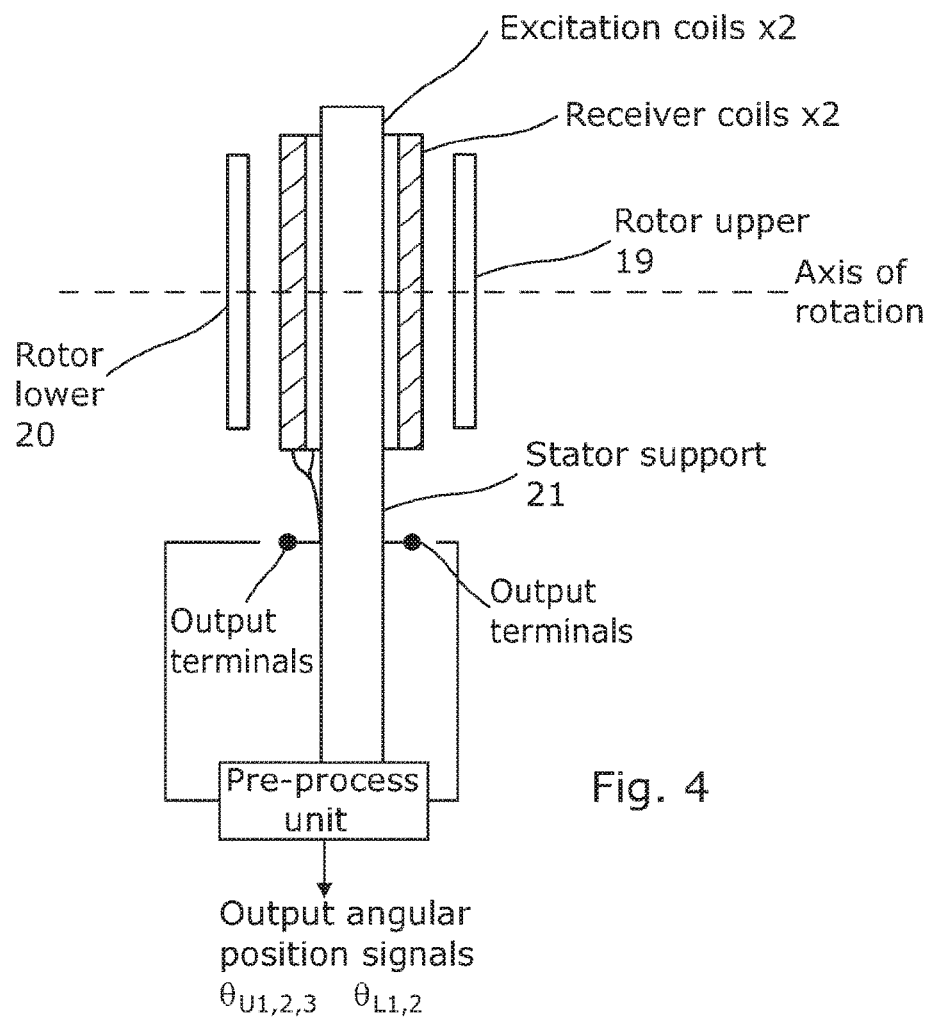
FIG. 4 is a general view of the mechanical arrangement of the sensor of FIG. 3.
Figure 5:
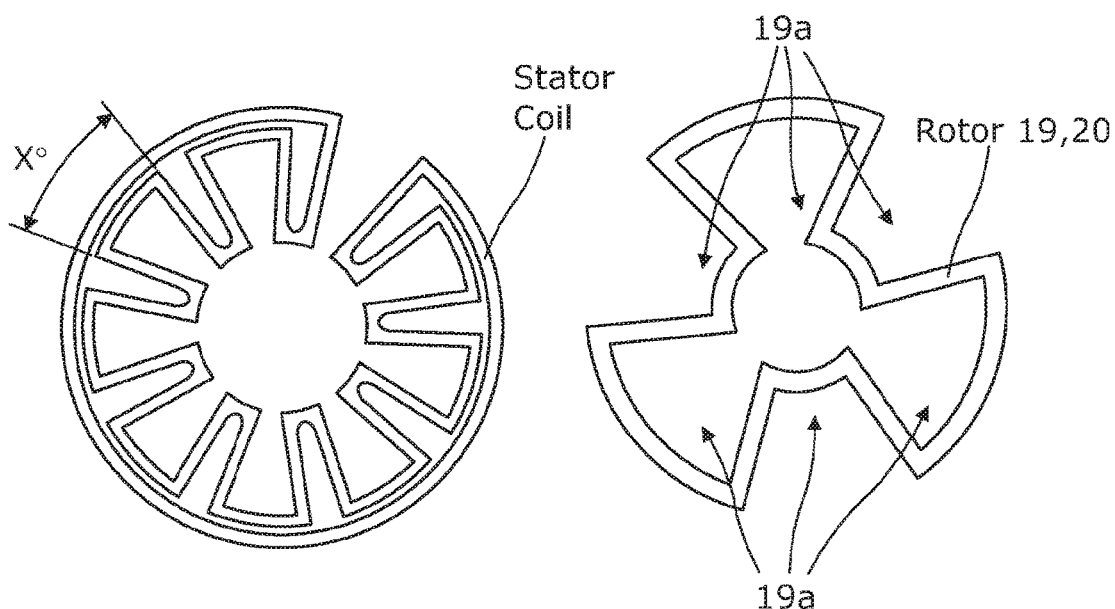
FIG. 5 shows in more detail one arrangement of the sensing electronics of the sensor of FIG. 4.

FIG. 3 shows an exemplary torque sensor assembly in more detail and FIGS. 4 and 5 show still more detail of parts of the sensor. In its most generic form the torque sensor can be any arrangement that produces two torque channels and an upper column position signal. Ideally these two torque channels and also the upper column position signal should be independent from each other.

In this example a sensor has been selected that comprises a combined two channel torque and single channel upper column position sensor having a total of five sensors 11, 12, 13, 14 and 15 combined in a single integrated unit with a common pre-processing unit that produces the sensor output signals from raw internal signals from the sensors. Three of the sensors are located on an upper column shaft 5a and two on a lower column shaft 5*b*, the two shafts being connected by a torsion bar 18 that twists as torque is applied across the shaft 5.

The five sensors comprise:

Two fine angle upper column angular position sensors 13, 14 attached to the upper column shaft end of the torsion bar and each producing an independent angular position signal (channel 1 signal and channel 2 signal) that together form a part of an upper column sensing means;

two fine angle lower column angular position sensors 11, 12 attached to the lower column shaft end of the torsion bar closest to the motor and each producing an independent angular position signal (channel 1 and channel 2 signal) that together form a lower column sensing means; and a secondary upper column position sensor 15 that produces a coarse resolution angular position signal and which can be considered a further part of the upper column sensing means.

The processor 17 uses a subtraction principle to detect twist in the torsion bar, subtracting the position of the lower shaft from that of the upper shaft (or vice versa) to determine an angular deflection value for the torsion bar. This is done twice, once for the upper and lower channel 1 signals, and again for the upper and lower channel 2 signals to give two independent torque measurements or torque channels.

The torsion bar 18 is designed to twist through a maximum of +/−5 degrees about a centre position in response to a maximum expected torque in each direction as described above. Once this range has been reached further twisting is prevented by the interengagement of the dog stops on the upper and lower column shafts, saving the torsion bar from damage and giving a solid connection should the torsion bar ever fail.

Each of the angular position sensing means includes a respective metal rotor 19, 20 comprising a flat metal disk having a plurality of equally spaced radial arms forming an annular track of cutouts 19*a* that extends around the disk. There are therefore two disks in total, one on the lower shaft and one on the upper shaft. The relevant parts of an exemplary sensor assembly are shown in FIGS. 4 and 5 of the drawings.

The angular width of each cut out is equal to the angular spacing between each cut-out. The spacing of the cut-outs of the lower shaft rotor is 40 degrees and the upper is 20 degrees. (in the example rotor and stator of FIG. 5 the angle is set by the spacing X degrees between the radial arms of the coils, and this will differ for the upper and lower sensors). They differ due to physical constraints in the manufacture of the particular sensor assembly are in some ways are unique to this described embodiment. Indeed it would be preferred if they were both 40 degrees or more in periodicity.

Each rotor 19, 20 cooperates with a stator support part 21 that comprises a printed circuit board to form two angular position sensors. The board 21 carries the active parts of the sensing means comprising two excitation coils and two sets of receiver coils, one excitation coil and one set of receiver coils forming each of the two sensors. The excitation coil of each sensor forms part of an LC circuit and generates a magnetic field. This field induces a current in the metal rotor and in turn the rotor generates its own magnetic field that couples back to the respective receiver coils of that sensor on the pcb. The induced voltages in each of the three receivers varies according to the rotor position and the pre-processing unit of the sensor assembly converts the three signals into an output signal for the sensor that varies linearly with rotor position. As the rotor rotates each of the angular position signals will vary linearly with a periodicity of 40 degrees for the lower rotor and 20 degrees for the upper rotor. The output signals therefore repeat many times during a complete revolution of the upper shaft and so on their own do not provide an indication of the absolute position of the shaft over the full range of movement of the upper shaft which is typically between 3 and 4 turns lock to lock of the steering wheel.

Figure 6:
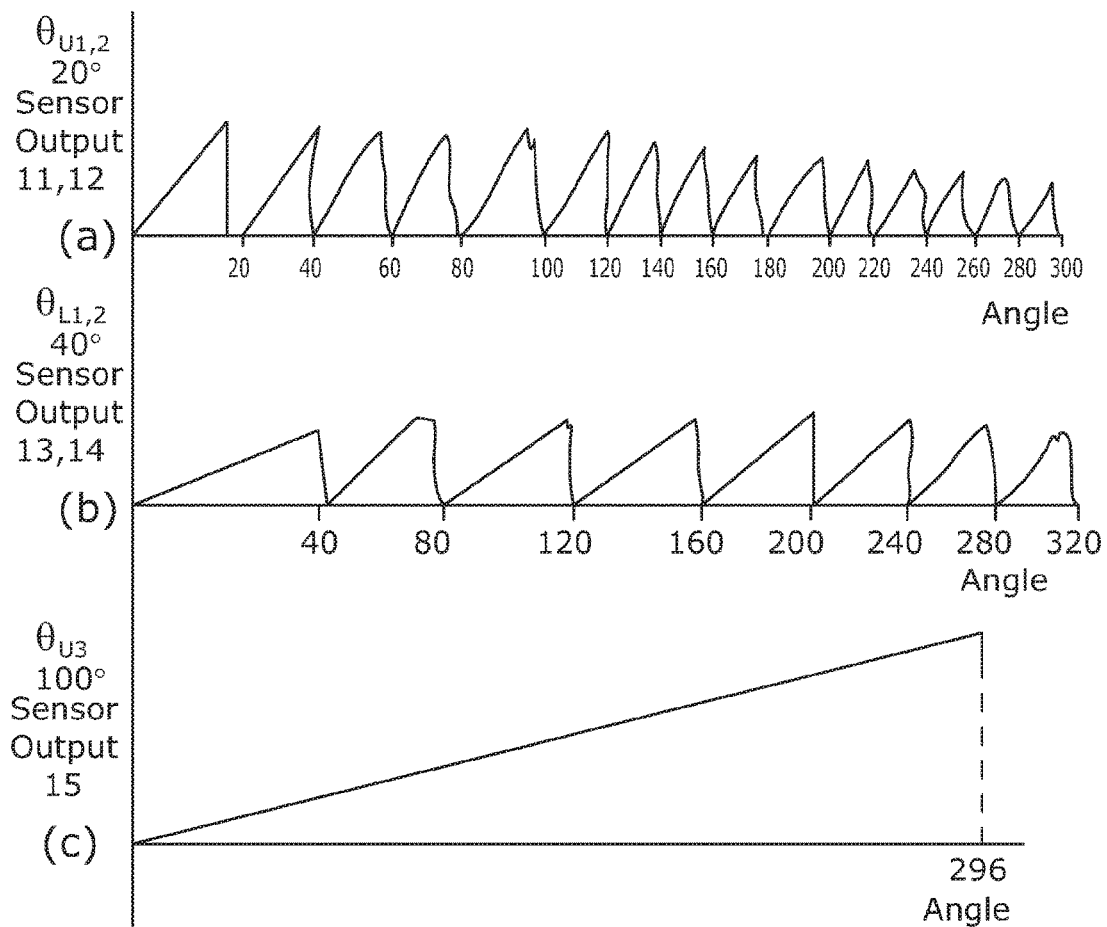
FIGS. 6(a) to (c) show the variation in the output signals of the sensors of FIG. 3.

FIGS. 6(*a*) and (*b*) shows how the output signal from the upper and lower sensor output signals vary over one full rotation of the steering shaft in the case where no torque is applied. As can be seen each varies linearly over 20 or 40 degrees before repeating. If a torque is applied the relative phase of these ramp signals will vary and this is what is used to determine the torque (the maximum twist of the torsion bar is considerably less than 20 degrees so there will always be an unambiguous phase change between the ramps that can be detected). This form of differential measurement across two sensors is well known in the art and so will not be explained further here.

Figure 7A:
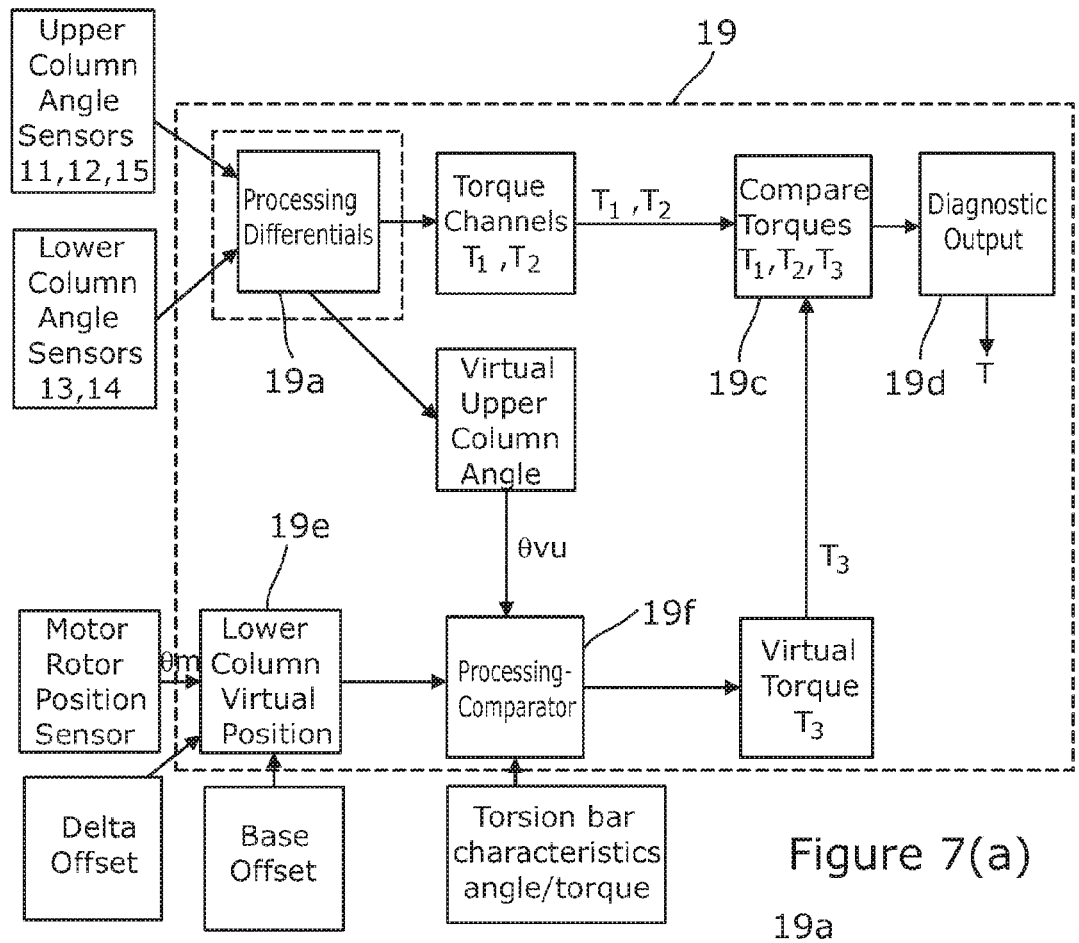
FIG. 7(a) is system diagram showing the inputs to the processing unit, the torque output from the unit that is fed to the motor controller and the processing stages that may be performed within the processing unit.
Figure 7B:
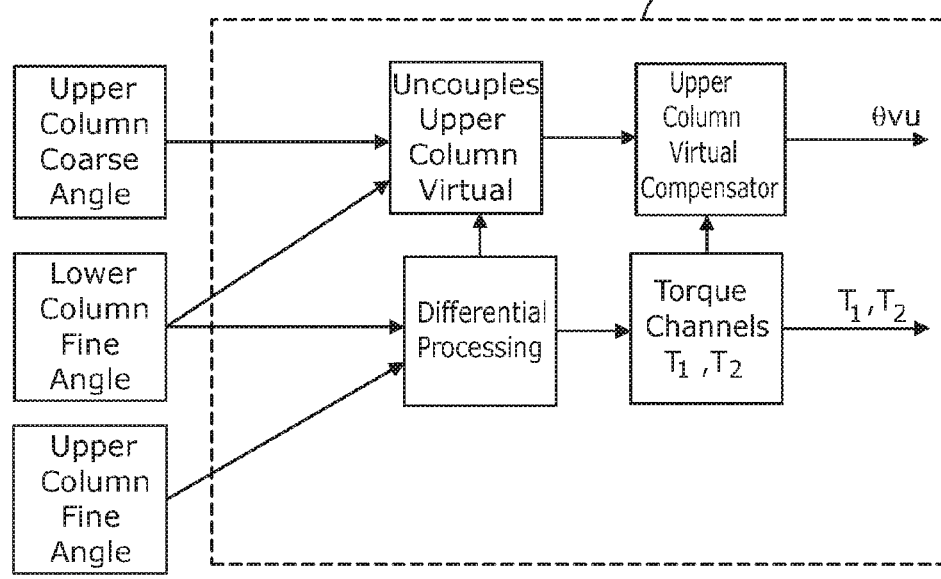
FIG. 7(b) shows in more detail the sub-stages that may be performed to generate a virtual upper column torque and the two torque channel signals.

The upper and lower sensor output signals are fed into a processing means 19, shown in FIG. 2 and in more detail in FIG. 7(*a*), which outputs the torque signal that is fed to the motor controller 8.

In use, as shown in FIG. 7*a*, the processing means 19, typically a signal processor formed from a microprocessor and associated memory which contain programme instructions, will in a first stage 19*a* compare the output signals for channel 1 from the upper and lower angular position signals to generate a first (channel 1) torque signal T1, and does the same for the channel 2 signals to produce a channel 2 torque signal T2 that is independent from channel 1. In normal operation these will provide the same torque value.

In addition, the processor produces 19*b* an absolute angular position signal representative of the absolute position of the upper shaft. This cannot be produced using the channel 1 or channel 2 angular position signals on their own because they repeat with a periodicity far less than one rotation of the upper column shaft. To get absolute position information, the processor therefore also uses the output signal from the secondary upper column shaft position sensor. This process, formed within stage 19*a*, is shown in more detail in FIG. 7(*b*).

This secondary sensor is connected to the upper column shaft through a gear wheel. This can be seen in FIG. 3. This sensor 15 has a much lower periodicity than either of the upper and lower column sensors, and in this example outputs a linearly varying signal that repeats every 296 degrees of rotation of the upper shaft. This is shown in FIG. 6 (*c*). It comprises a single magnet with a north and south pole that rotates past a single Hall effect sensor, giving a ramped waveform that varies through one cycle over the 296 degrees. The signal is a "coarse" signal because for a given level of bits in the digital signal it must cover all the values from 0 to 296. By comparison, for the 20 degree sensor it is a "fine" signal because the bits in the digital signal must cover a small range of angles, e.g. more than 10 times the angular resolution for a given number of bits in the digital signal.

Figure 11:
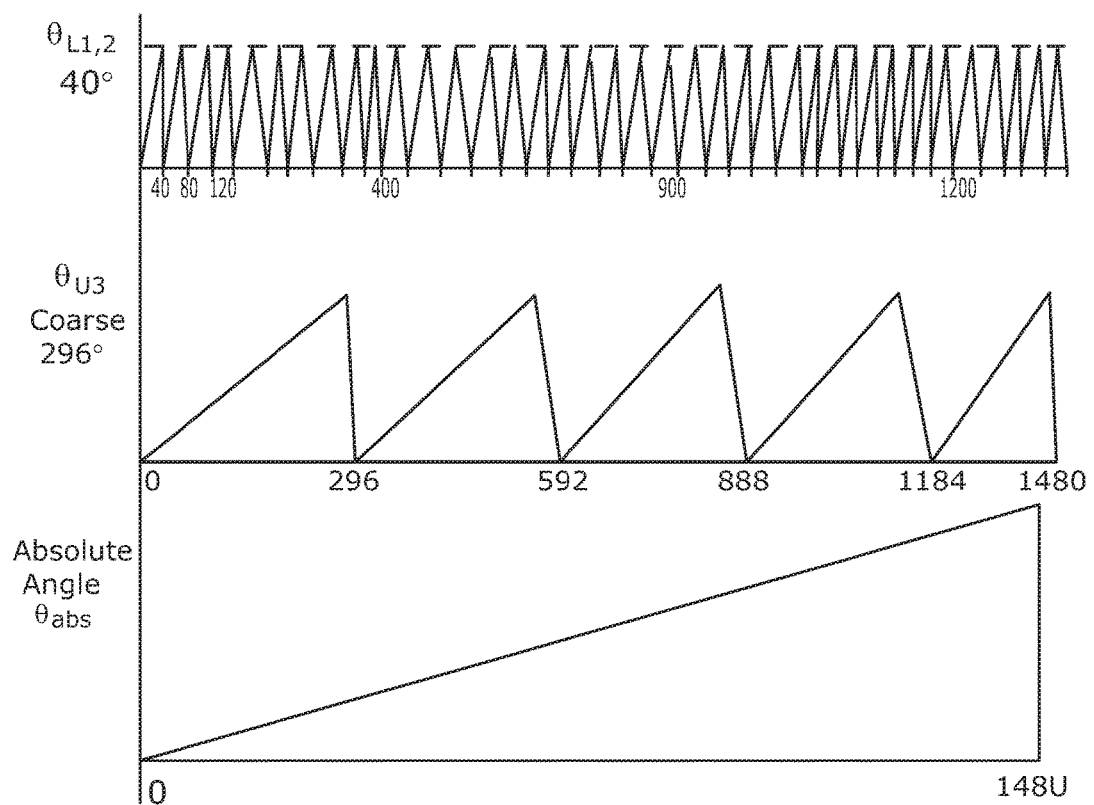
FIG. 11 shows the generation of a 0-1480 signal produced by observing the difference between the 40 degree and 296 degree angle signals.

To get the absolute column position the processor may process the value of the secondary sensor output signal, repeating every 296 degrees, with that of the 20 degree or 40 degree sensor. In this example, it processes it with a modified form of the channel 1 signal from the lower column sensor, modified to remove the effect of twist of the torsion bar to form a "virtual upper column position signal" that repeats every 40 degrees of rotation. This comparison enables a unique angular position signal for the upper column to be produced that repeats every 1480 degrees (since this is the angle of rotation before the pairing of values of the secondary sensor and virtual upper column signal). This is shown in FIG. 11.

The "virtual upper column position signal" is a modified form of the output of the lower shaft angular position sensor. The lower shaft angular position is modified, or compensated, by the processor to take into account the effect of torque twisting the torsion bar. The "virtual upper column position signal" repeats every 40 column degrees, whereas the upper angle position sensor repeats every 20 degrees. This transformation is necessary so that the combined signal has appropriate range and can cover the required 3 or more turns of steering wheel lock before a repeating (i.e. non unique angular position value is calculated).

Note that this use of a "virtual" upper column position signal is specific to this embodiment where the 20 degrees sensor is on the upper column and the 40 on the lower. If they had been the other way round it would be possible to combine the secondary sensor value with the upper column sensor channel 1 or channel 2. As it is, use of a 20 degree sensor would not give the required unique absolute position signal over a typical 3 to 4 turn lock to lock as the pair of signals would give non-unique values after far less rotation of the upper column shaft, less than the required 3 to 4 turns lock to lock.

The processing means 19, when functioning correctly as described above, produces two torque signals (channel 1 and channel 2) and an absolute upper column position signal using some of the sensor information common to the production of channel 1 of the torque signal.

The controller 8 requires only one of the two torque signals to function, i.e. it needs a valid torque signal. Therefore, before passing one of the channels to the controller the processor of the combined torque and angular position sensor checks in a stage 19c that they are in agreement. If they match, the average of the two torque signal is fed to the controller 9. If they match, it is assumed that the value is correct.

If the check stage 19c sees that they do not match, and do not match by more than a safe acceptable amount, the two torque channels are also checked in that stage against a third "virtual" torque signal T3 that is produced using a motor position sensor 20 as will now be described. If the third signal matches one of the torque channels T1 or T2, then that torque channel is fed to the controller 8 as it is assumed to be reliable. If it does not match either channel 1 of channel 2 torque an error is flagged at a diagnostic output 19d and assistance is stopped.

In addition to the combined torque and position sensor the apparatus therefore includes a motor position sensor 20 that has its own processor 21. The motor position sensor 20 is similar in construction to one of the position sensors of the torque sensor, with a rotor and a stator. The rotor and stator form an incremental encoder with a metal encoder disk defining encoder regions over a full revolution similar to those of the torque sensor attached to the motor rotor. The sensor also comprises three Hall effect sensors that cooperate with an index track, each producing a signal that is 120 degrees out of phase with the other two. Hall sensor 1 reads 1 from 0-120 degrees electrical and zero for all other angles. Hall sensor 2 reads 1 from 120-240 degrees electrical and zero for all other angles. Hall sensor 3 reads 1 from 240 to 0 degrees and 0 at all other angles.

Figure 9:
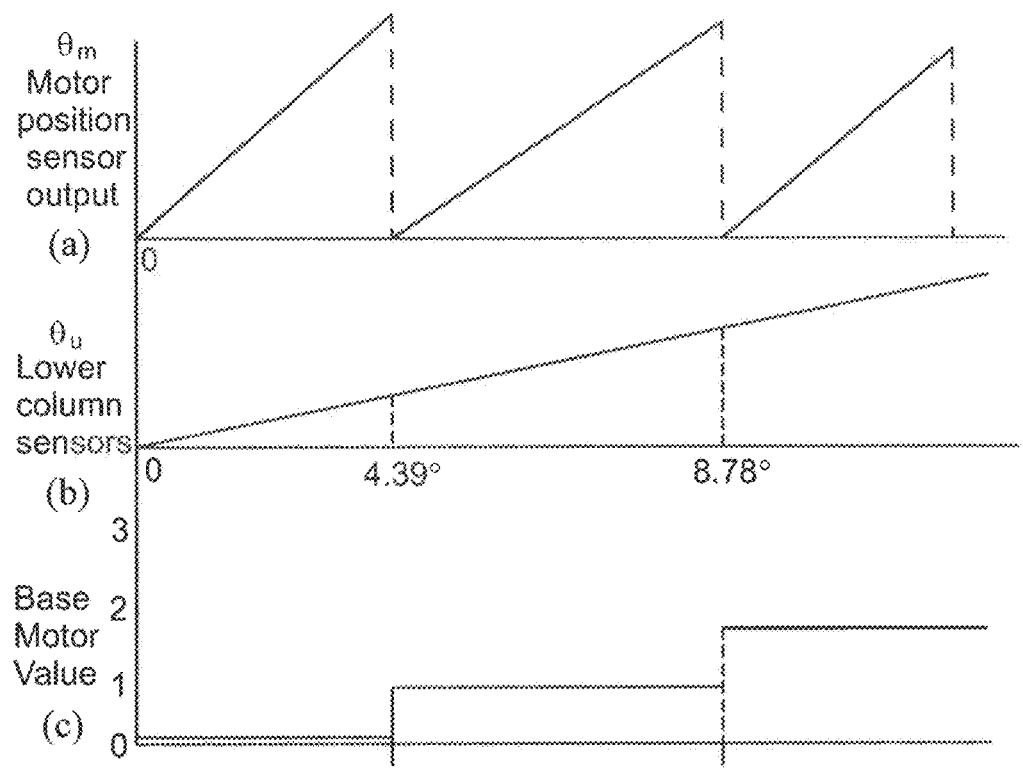
FIG. 9(a) shows the variation in motor position sensor output, FIG. 9(b) the corresponding variation in lower column position (taken with zero including a notional delta offset of zero degrees in this example) and FIG. 9(c) the variation in base motor position value.

The incremental encoder has two sensors 90 degrees out of phase with the other to give an A and B channel. As the rotor rotates through one full electrical motor revolution each of the A and B channels will vary between a 0 and 1 value to give a repeating waveform as shown in FIG. 9. Providing two channels allows the direction of rotation to be determined by looking at the order in which the edges of each signal occur and whether they are rising or falling edges. The incremental encoder counts up as the rotor rotates until it has gone through one full rotation, at which time the count is reset to zero and the count repeats, or the direction changes and the counter counts down.

The motor 2 has four electrical rotations per mechanical rotation, so one cycle of the incremental encoder (360 degrees electrical) equals 90 degrees mechanical rotation of the motor rotor. The motor output shaft spins with the rotor and is connected to the lower column shaft through a gearbox with a ratio of 20.5 turns (of the motor) for one full turn of the lower column shaft. Thus, each cycle of the motor position signal will correspond to 4.39 degrees of rotation of the lower column shaft. This is shown in FIG. 9(a).

The output of the motor sensor is converted by the processing unit, in stage 19e, into a measure of position expressed in the upper column shaft reference frame by the processing unit 19 using the equation:

Absolute virtual lower column position=base motor offset+unwrapped motor position signal value delta offset;

Where:

delta motor offset is the value of (wrapped) motor electrical position when the (virtual compensated) upper column angle sensor reads zero degrees (and there is no torsion bar deflection)

base motor offset has a value indicative of how many full electrical turns the upper column was away from zero degrees at key The delta and base motor values are needed to place the motor position signal into the same frame as reference as the upper column absolute position signal that is produced by the processor of the combined torque and position sensor.

The value of delta offset can vary by up to one motor position sensor wrap (one complete motor rotor electrical revolution) which means it will take a value of between 0 and 4.39 degrees in this example. The actual value depends on how the motor position sensor is aligned with the steering column lower shaft during assembly and in use will not vary. Similarly, each increment in the counter (the base value) will correspond to 4.39 degrees of rotation away from a central zero position.

The method by which the processing means produces the third virtual torque signal, and in particular how it calculates the base motor position value, will now be explained. This should be read in conjunction with FIG. 7(a) which shows the processing stages performed by the processing means 19.

As described above a virtual lower column position signal is generated in stage 19e from the motor position signal 20 provided that the count value (the base motor position) is reliable and the delta offset of the motor during manufacture is known. A process of determining these during operation, such as following key one when they are not reliable, is explained later, but for now it is assumed that these are known.

From the virtual lower column position signal the location of the lower column shaft in the frame of reference of the upper column shaft can be determined. The absolute position of the upper column shaft is already known because it is produced by the processor unit 19 as part of the generation of the two torque channels. These two signals are then compared in a stage 19*f* to determine the difference between these two signals. This difference indicates the amount of twist of the torsion bar. Processing this with knowledge of the properties of the torsion bar, i.e. how much it twists for a given torque, allows the torque in the torsion bar to be determined by the processor to form the virtual torque channel T3.

Note that whilst a virtual lower steering column shaft position signal can be produced from the motor position sensor it is not possible to produce an accurate virtual upper column position signal because the torque is not known and hence the effect of offset between the lower and upper shafts due to twisting of the torsion bar is unknown. However, a good estimate of the twist can be made if the channel 1 or channel 2 torque T1 or T2 is relied upon in order to perform the transformation to the upper column frame of reference.

The skilled person will appreciate that the production of the virtual torque depends on being able to express the angular position of the motor rotor and the angular position of the upper column shaft in the same frame of reference. There are two primary factors, in addition to the actual torque applied to the torsion bar that determine the relationship between these signals (others being the relative timing of the signal capture and any gearbox lash or compliance between the motor output shaft and the lower column shaft): Delta offset and Base motor position.

Determining the Delta Offset

The delta offset will generally be stored in permanent memory and can be learnt after manufacture and reused on each key on. It will not change. One method by which the processing means can learn the offset is to look at the motor position signal when it is known that there is zero torque across the torsion bar and when the upper column shaft is straight ahead, i.e. at the zero position. This check can be made at any time as long as the torque sensor is working, i.e. both torque channels give the same reading.

Alternatively, the apparatus may take the difference between upper column angle corrected for torsion bar deflection (so now a lower column angle) and unwrapped motor angle. It may then consider the remainder of this angle after division by 4.39 degrees. That is delta motor offset. This approach has the advantage that can operate continuously. Because there is no guaranteed alignment of units in vehicles it is possible that in some vehicles the upper column angle will never read zero degrees if the steering gear limits travel to, say −1080 degrees, of a total range of, say, 1480 degree of output of the sensor.

Determining the Base Motor Position.

Unlike the delta offset, which only has to be learnt once due to the fixed angular relationship between the motor and the lower column shaft, the base motor position will generally be unknown at key on. This is because when the system is keyed off, and not learning or monitoring the sensor signals, the steering may be turned through any angle which will cause the motor rotor to rotate through one or more full turns. At key on, the relative angle of the motor rotor can be determined directly from the motor position sensor but the base motor position will be unknown as the counter value has not been updated and will therefore be unreliable.

A process of learning the base motor position during use of the system after key on and prior to providing any assistance torque (during a limp home mode) is therefore provided within the processing means.

Initially, after key on, an estimate of the base motor offset is generated by subtracting the lower column angle (motor angle corrected for delta motor offset) from the upper column angle and rounding the result to the nearest motor rotation (4.39 degrees).

In addition, a base motor offset that is one wrap less than this is chosen, and one which is one wrap more than this central estimate is taken. Each one of these is a plausible base motor value offset if there is a large magnitude torque carried by the torsion bar at key on because the torsion bar deflection could have introduced at most one addition rotation of the motor (one motor rotation is 4.39 degrees of upper shaft rotation and the maximum allowed rotation of the torsion bar is 5 degrees which is less than 2*4.39 degrees.

Figure 8:
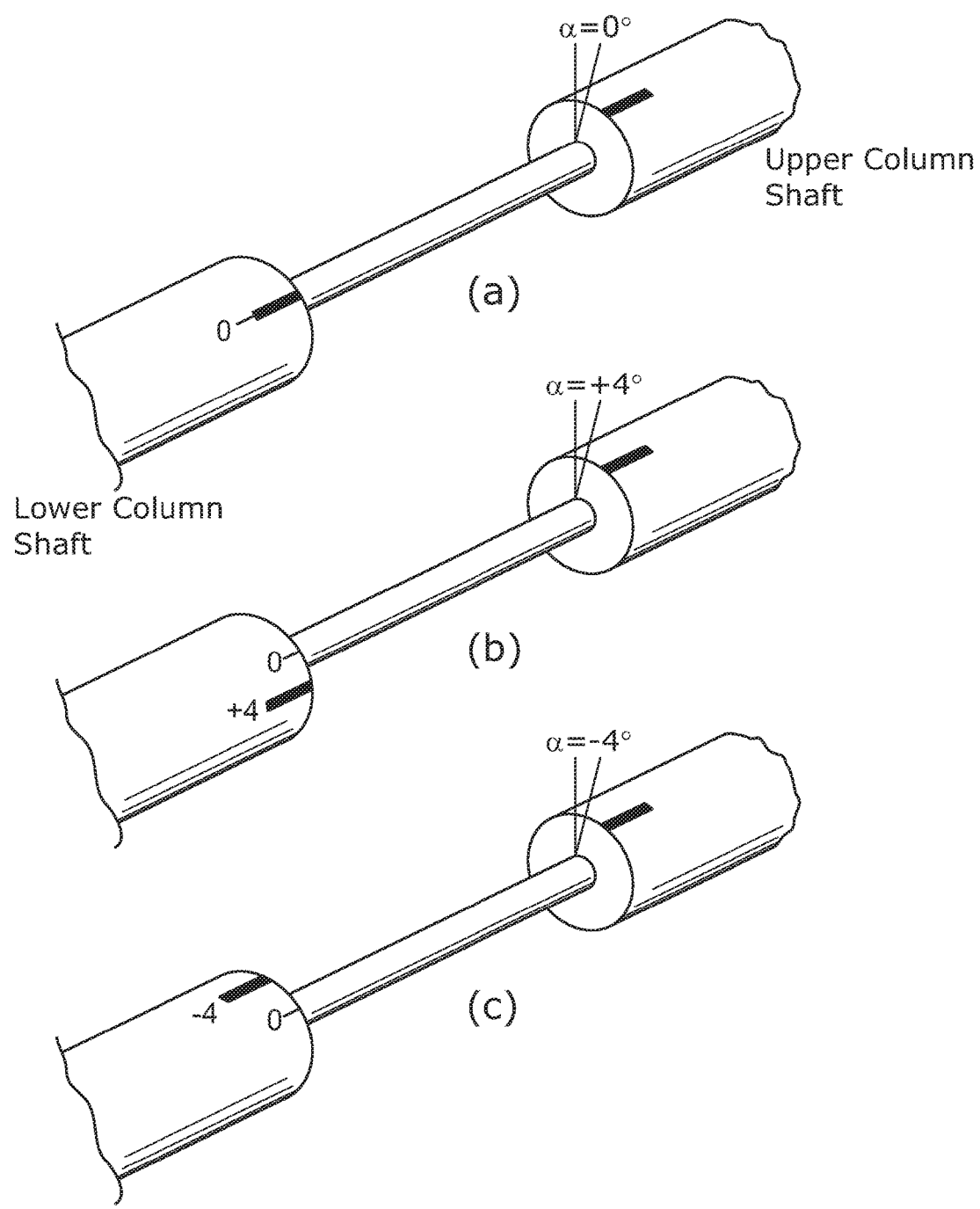
FIG. 8(a) to (c) shows the effect of twist in the torsion bar on the relative positions of the upper and lower shaft.

The need for three estimates can be understood with reference to FIG. 8, which shows that there may be a twist in the torsion bar, alpha, of unknown magnitude between +−5 degrees from zero. With zero twist, the two marks shown in FIG. 8(*a*) will be in line as shown and the central estimate will turn out to be correct. With a positive 5 degree twist, the central estimate will be wrong by 5 degrees or 1 turn (when rounded) as the motor will have turned by 1 more rotation than the number suggested by the central estimate. With a negative 4 degree twist, the central estimate will again be wrong as the motor will have made one less turn.

Next, as the vehicle is driven, the deflection of the torsion bar is calculated based on each of the three base motor position values. At extremes of torque in the torsion bar, two of these estimated base motor position values will give an impossible amount of twist in the torsion bar and so can be ruled out.

The behaviour of the system in each of the three possible scenarios at key on (zero torque, high positive torque and high negative torque) is set out below.

Zero or Low Torque at Key on.

In this situation the central value is the correct one, although initially this is not known. The torsion bar deflection is calculated using all three base motor values. As a large positive torque is applied, the value of the calculated torsion bar deflection (or the calculated third virtual torque value) will fall within a plausible range for the central value but fall outside of a plausible range for the highest base motor position value. This highest value can therefore be eliminated as a plausible value for key on. Similarly as a high negative torque is applied the third torsion bar deflection will stay within an acceptable range for the central value but the low base motor position value will give a torsion bar deflection that is outside of an acceptable range and can be eliminated leaving only the central value as the correct value. This is then used as the base motor position value and the system is taken out of limp home mode to apply an assistance torque.

Positive Torque Across the Torsion Bar During Key on

In a similar manner, if there was a positive torque present during key on and a negative (or less positive) torque is applied to the torsion bar then first the lowest estimate will give a torsion bar deflection that is outside of an allowable range and can be eliminated. As more negative torque is applied the central estimate will be eliminated.

Negative Torque Across the Torsion Bar During Key on

In a similar manner, if there was a negative torque present during key on and a positive torque is applied to the torsion bar then first the highest estimate and then the central estimate will give a torsion bar deflection that is outside of an allowable range and can be eliminated.

The applicant has also appreciated that any small timing errors in the system can lead to large errors in the estimate of torque. This is a particular problem where signals are supplied by two different processors, as will be the case where one is handling the motor position sensor processing and the other the torque sensor processing. To alleviate this problem a time stamp is applied to each position signal value generated in each processing unit. Then, when signals from different units are combined a correction can be applied to bring them into exactly the same time frame allowing the magnitude of any error to be reduced to within acceptable boundaries.

To improve the accuracy of the signals produced by the various processors, each sample value of the raw signals produced by the sensors, e.g. the angular positions sensor output signals and the motor position signal, are given a time stamp. The time stamp represents the precise moment in time that the sample was captured. In a digital system, each output signal will comprise a stream of discrete values, each representing the state of the measured parameter at a given time. The exact timing will depend on the clock for the processor used to produce the signals, and where two or more processors are used the edges of the clocks may not be exactly aligned or the samples may be captured one or more clock cycles apart.

When comparing the signals, the time stamp allocated to each value is observed by the processor. The difference between the two time stamps is then determined by the processing means and multiplied by a measure or estimate of the column velocity determined from historical positions measurements. This generates a correction value which can be added to the measured signals to effectively extrapolate the older of the signals (the one with the oldest time stamp) to the latest signal frame. This methodology assumes velocity is constant in that time, which is reasonable in most cases. The signals are thereby "time aligned" so that they correspond to the exact same moment in time.

By time aligning the signals a useful increase in the accuracy of the signals that are produced can be achieved.

Cross Check of Angle Signals.

In this particular implementation, the virtual torque is produced by relying on the channel 1 lower and upper angle signals being without error, since these are required to produce the virtual upper column angle signal. In the case where torque channel 2 has failed we end up with a situation where both torque channel one (our remaining good channel) and the virtual torque signal depend on the same components functioning correctly. This is a potential common mode failure mode. A failure in (say) the upper column angle signal can cause both torque channel one and the virtual torque signal being in error by the same amount. The virtual torque diagnostic will not detect this failure. To prevent this failure mode we introduce an independent check on the virtual upper column angle signal. This check uses independent (coarse angle) information to detect the common mode failure.

A check is therefore made by the checking unit in which two absolute angular position signals are produced from the fine angle 40 degree sensor and the coarse sensor, the two then being compared.

The first of these signals is produced using the fine sensor for the resolution and the value of the coarse sensor to indicate which "repeat" of the 40 degree sensor is present (by looking at the relative phasing between the outputs of the two sensors). For example, with an absolute position of 70 degrees the fine sensor will read "30 degrees" and the coarse sensor a coarse 70 degrees which allows the processor to determine that the fine sensor is on 1 repeat and give a position of 30+40 degrees=70 degrees.

The second absolute position is worked out by using the coarse sensor to determine the resolution and the fine angle sensor to determine what repeat (i.e. multiple of turns of the coarse sensor) the steering is on. For example with 70 degrees the coarse will read 70 degrees and a cross check with the fine angle will reveal that the coarse sensor is on its first turn, giving an angle of 70+0=70 degrees.

If there is an error in either sensor, the two absolute position values will not agree and an error will be flagged up by the checking unit.

The checking unit may also carry out a check of the variation in the virtual upper column angular position value and the output of one or both of the upper column position signals with a change in angle of the shaft 5. The applicant has appreciated that as the shaft rotates there will be some variation in the output of each sensor relative to the other due to things such as run out of the rotors. These variation between the two sensors with angle will be consistent during use of the assembly, and can be monitored as the steering rotates and store in a memory. If the variation between the sensors with angular position does not vary in the expected manner, the checking unit may flag up an error. Since there are many instances during use of a steering system where the shaft is rotating it is easy to regularly perform this check within the checking unit.

Figure 10:
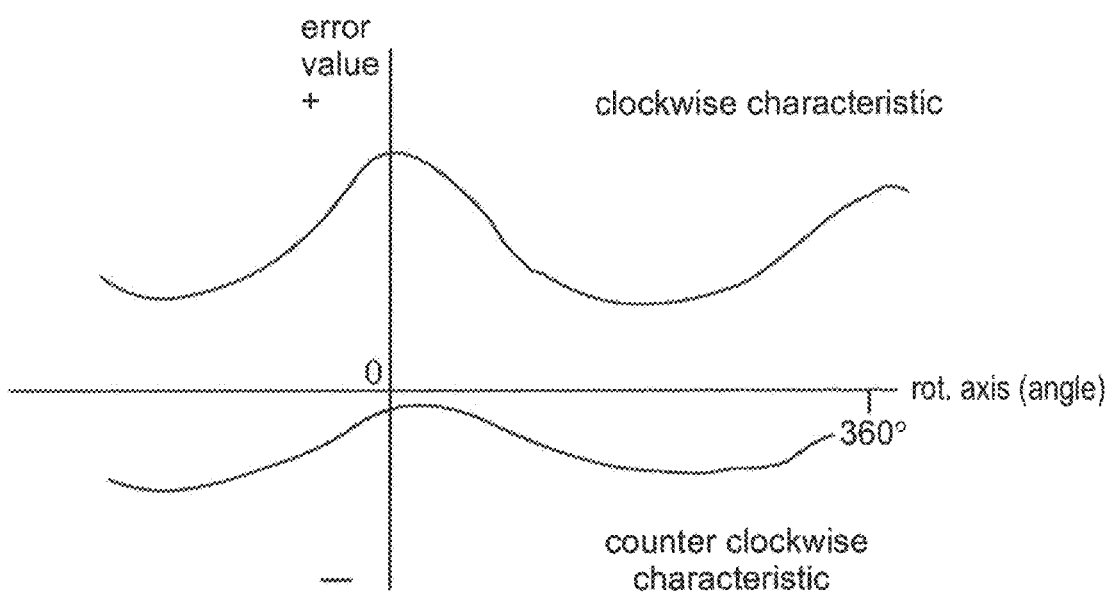
FIG. 10 shows the variation between angular position sensor outputs as the steering shaft 5 is rotated due to run-out and the like in the sensor rotors.

FIG. 10 shows a typical variation with angle for both a positive and a negative direction of rotation. The two differ due to effects such as lash within the sensor. These difference values may be stored in a memory of the checking unit. Alternatively, rather than absolute difference values the change in value with change in angle may be stored—e.g. error increases by X for a 1 degree positive rotation, then decreases by Y for the next degree and so on. Again, the checking unit would be looking for the expected pattern of change.

Of course, the check could be performed outside of the checking unit, for example is a separate processing unit or within the combined torque and angular position sensor assembly itself.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A combined angular position and torque sensor assembly for use in an electric power assisted steering system, the combined assembly comprising:
   an input shaft for connection to an upper column shaft that in use is operatively connected to a steering wheel of a vehicle,
   an output shaft for connection to a lower column shaft that in use is operatively connected to road wheels of the vehicle,
   a torsion bar that interconnects the input shaft and the output shaft,
   a first upper column angular position sensor that produces at least one output signal that is dependent on an angular position of the upper column shaft;
   a secondary upper column angular position sensor that produces at least one output signal that is dependent on the angular position of the upper column shaft; and
   a processing means which produces a first torque signal indicative of the torque carried by the torsion bar,
   wherein the processing means further includes means for producing a first absolute angular position signal by processing the output signals of the first and secondary sensors in a first way and a second absolute angular position signal processing the output of the same two sensors in a different way, and further comprising:

a cross checker that performs a cross check between the first and second absolute angular position signals.

2. The combined assembly according to claim 1 in which each of the angular position sensors produces an angular position signal that repeats at least once during a permitted range of angular rotation of the input shaft, the range of angular rotation of each sensor corresponding to one full repeat being different from the other of the two sensors.

3. The combined assembly according to claim 1 in which the two sensors each produce an output signal which has a different angular range, or at least one of the two may have a different range to one of the others.

4. The combined assembly according to claim 1 that further includes a third, lower column, angular position sensor that produces at least one output signal that is dependent on an angular position of the lower column shaft, and the processing means produces the first torque signal by processing the output signals from the three sensors.

5. The combined assembly according to claim 1 in which the processing means generates the first of the absolute angular position signals used in the cross check by using the output of a first one of the sensors to provide a resolution and the value of the output of a second one of the sensors to indicate which repeat of the sensor is present by looking at the relative phasing between the outputs of the two sensors.

6. The combined assembly according to claim 1 in which the processing means generates the second of the absolute angular position signals used in the cross checker by is using the output of the second one of the sensors to provide a resolution and the value of the output of the first one of the sensors to indicate which repeat of the sensor is present by looking at the relative phasing between the outputs of the two sensors.

7. The combined assembly according to claim 1 which further includes an absolute position signal generating means that in use produces an absolute upper column position signal indicative of the angular position of the upper column shaft by combining the signals from at least one pair of the position sensors.

8. The combined assembly according to claim 6 in which the cross checker is adapted to carry out a check of a variation in the absolute angular position signal and the output signal of one or both of the angular position sensing means of the upper column shaft over a range of different angles of the upper column shaft.

9. The combined assembly according to claim 8 in which the cross checker is adapted so that in the event that the variation between the two sensors with angle will be does not vary in the expected manner, the cross checker flags up an error.

10. The combined assembly according to any one of claim 8 in which the cross checker is adapted to learn an expected variation with angular position during an initial learning phase of the combined assembly by monitoring the variation in each of the two absolute position signals being cross checked and storing the difference, or error, between the two absolute position signals.

* * * * *